(12) United States Patent
Corattiyil et al.

(10) Patent No.: US 8,915,057 B2
(45) Date of Patent: Dec. 23, 2014

(54) GAS TURBINE ENGINE SUMP PRESSURIZATION SYSTEM

(71) Applicant: General Electric Company, Schenectady, NY (US)

(72) Inventors: Bala Corattiyil, Montgomery, OH (US); Richard William Albrecht, Jr., Fairfield, OH (US); Bradley W Fintel, West Chester, OH (US); Rebecca J. Schmidt, North Bend, OH (US); Scott Wolfer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/237,384

(22) PCT Filed: Feb. 9, 2013

(86) PCT No.: PCT/US2013/025467
§ 371 (c)(1),
(2), (4) Date: Feb. 6, 2014

(87) PCT Pub. No.: WO2013/162672
PCT Pub. Date: Oct. 31, 2013

(65) Prior Publication Data
US 2014/0345246 A1    Nov. 27, 2014

Related U.S. Application Data

(60) Provisional application No. 61/597,439, filed on Feb. 10, 2012.

(51) Int. Cl.
*F02C 7/06* (2006.01)
*F02C 6/08* (2006.01)
*F01D 5/08* (2006.01)
*F01D 11/04* (2006.01)

(52) U.S. Cl.
CPC . *F01D 11/04* (2013.01); *F02C 7/06* (2013.01); *F02C 6/08* (2013.01); *F01D 5/082* (2013.01); *F05D 2260/98* (2013.01)
USPC .............................. 60/39.08; 60/266; 415/115

(58) Field of Classification Search
CPC ........... F01D 11/04; F01D 5/08; F01D 5/082; F05D 2260/98; F02C 6/08; F02C 7/06
USPC ..................... 60/39.08, 266; 415/115, 176, 60
See application file for complete search history.

(56) References Cited

U.S. PATENT DOCUMENTS 2,636,665 A    4/1953  Albert
2,910,268 A    10/1959 Omri
(Continued)

OTHER PUBLICATIONS

PCT Written Opinion and Search Report from corresponding PCT application No. PCT/US2013/025467, dated Dec. 10, 2013.

*Primary Examiner* — J. Gregory Pickett
(74) *Attorney, Agent, or Firm* — General Electric Company; Pamela A. Kachur

(57) ABSTRACT

A sump pressurization system for a gas turbine engine comprises a first hollow shaft and a second hollow shaft disposed within the first hollow shaft and defining a cavity therebetween. Each of the first and second hollow shafts has a common axis of rotation. Also included is a source of pressurized air to pressurize the cavity and a plurality of hollow tubes disposed in the cavity. The tubes are oriented perpendicular to the axis of rotation and are connected to and rotatable with the first hollow shaft. A plurality of apertures in the second hollow shaft are in fluid communication with the tubes, such that pressurized air flowing through the tubes passes through the apertures into the interior of the second hollow shaft.

15 Claims, 2 Drawing Sheets

(56) References Cited

U.S. PATENT DOCUMENTS

| | | |
|---|---|---|
| 2,844,110 A | 10/1974 | Widlansky |
| 3,844,110 A * | 10/1974 | Widlansky et al. .......... 60/39.08 |
| 6,334,755 B1 | 1/2002 | Coudray |
| 2007/0053770 A1 | 3/2007 | Lammas |

* cited by examiner

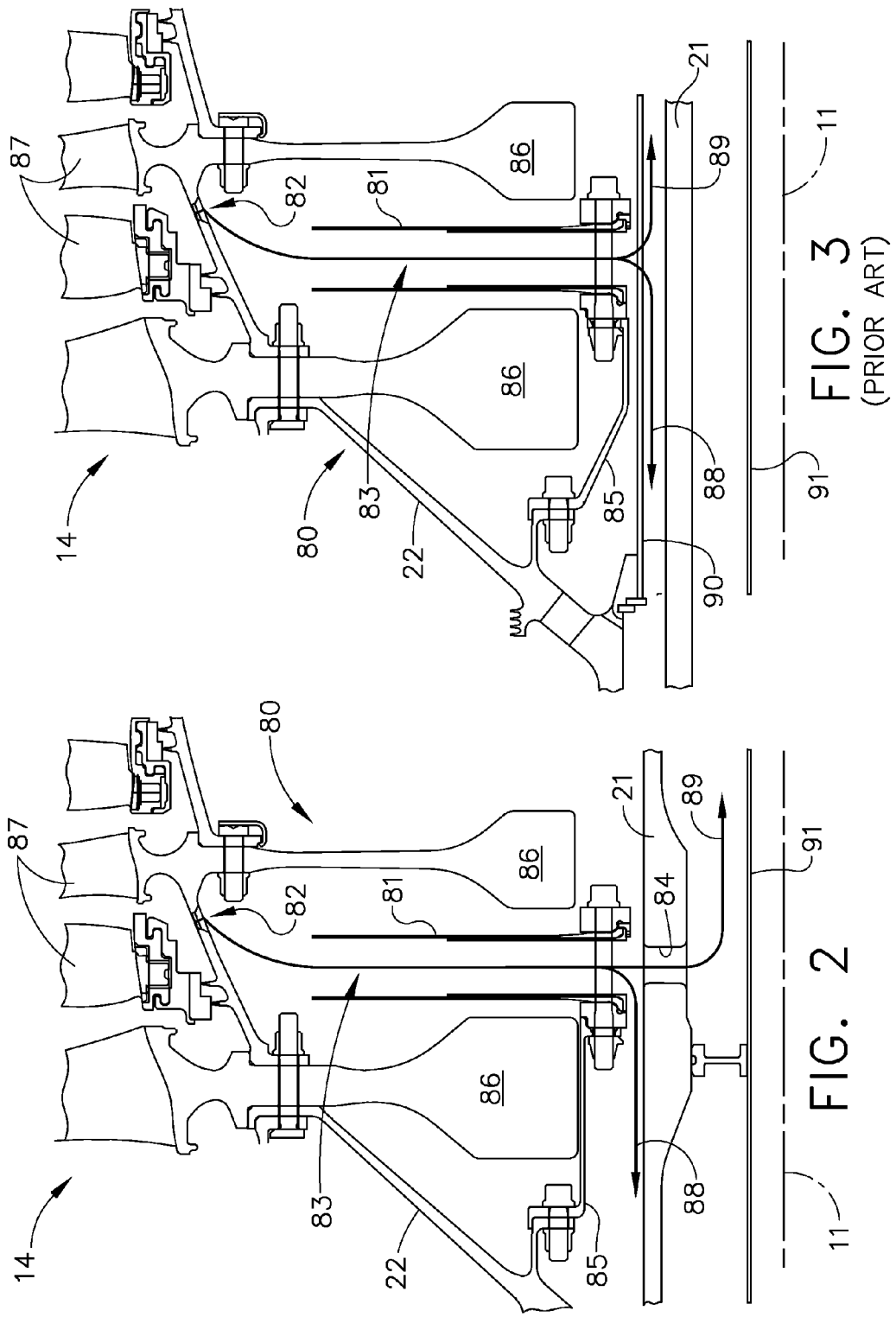

GAS TURBINE ENGINE SUMP PRESSURIZATION SYSTEM

CROSS-REFERENCE TO RELATED APPLICATION

This application is a U.S. National Phase application claiming priority to PCT International Application No. PCT/US2013/025467, filed Feb. 9, 2013 which claims the benefit of U.S. Provisional Application Ser. No. 61/597,439, filed Feb. 10, 2012 both of which are incorporated herein by reference.

STATEMENT REGARDING FEDERALLY SPONSORED RESEARCH & DEVELOPMENT

The US Government may have certain rights in this invention pursuant to Contract No. FA8650-07-C-02802 awarded by the US Department of the Air Force.

BACKGROUND OF THE INVENTION

The technology described herein relates generally to sump pressurization systems, and more particularly to such systems for gas turbine engines.

Aft sump pressurization is important to prevent oil leaks and turbine cavity fires. This is usually accomplished by a double-walled rotating duct that acts as a conduit for booster or compressor air for pressurizing the aft sump and also minimize heat pickup from high pressure compressor (HPC) and high pressure turbine (HPT) bore.

In the current designs, gas turbine aft sump pressurization is usually accomplished, by extracting air from compressor front stages radially inward thru rotating radial tubes and transporting it aft to the aft sump thru a double walled duct that rotates with the HP shaft about the engine centerline.

There remains a need for improved aft sump pressurization systems which will provide pressurization in a robust and economical fashion.

BRIEF SUMMARY OF THE INVENTION

In one aspect, a sump pressurization system for a gas turbine engine comprises a first hollow shaft and a second hollow shaft disposed within the first hollow shaft and defining a cavity therebetween. Each of the first and second hollow shafts has a common axis of rotation. Also included is a source of pressurized air to pressurize the cavity and a plurality of hollow tubes disposed in the cavity. The tubes are oriented perpendicular to the axis of rotation and are connected to and rotatable with the first hollow shaft. A plurality of apertures in the second hollow shaft are in fluid communication with the tubes, such that pressurized air flowing through the tubes passes through the apertures into the interior of the second hollow shaft.

BRIEF DESCRIPTION OF THE DRAWINGS

FIG. 2 is an enlarged partial elevational illustration of an exemplary sump pressurization system; and FIG. 3 is an enlarged partial elevational sectional illustration similar to FIG. 2 of a representative prior art sump pressurization system.

DETAILED DESCRIPTION OF THE INVENTION

Figure 1:
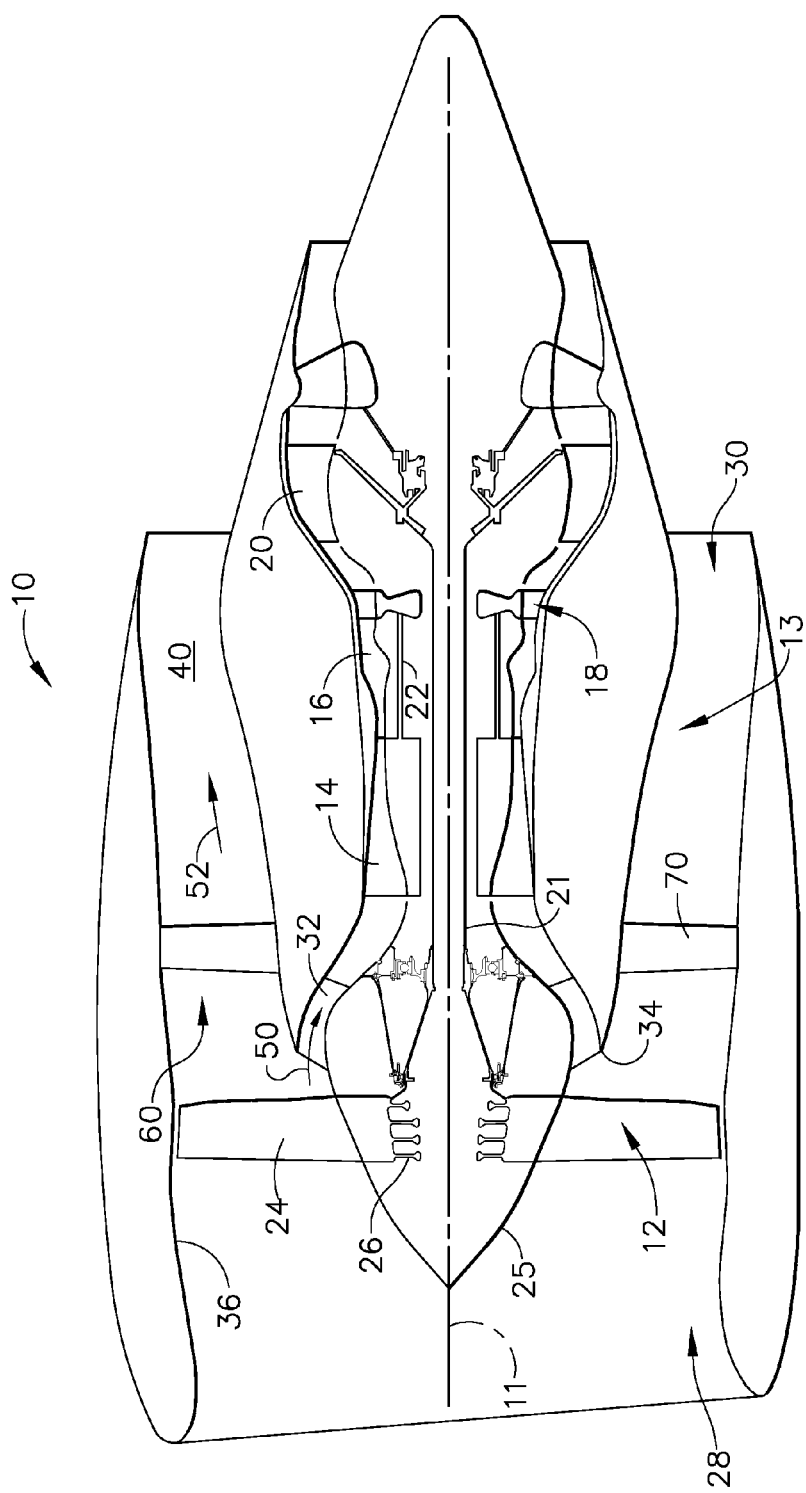
FIG. 1 is a cross-sectional illustration of an exemplary gas turbine engine assembly.

FIG. 1 is a cross-sectional schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster compressor 32, and a splitter 34 that substantially circumscribes booster 32.

Fan assembly 12 includes an array of fan blades 24 extending radially outward from a rotor disk 26, the forward portion of which is enclosed by a streamlined spinner 25. Gas turbine engine assembly 10 has an intake side 28 and an exhaust side 30. Fan assembly 12, booster 32, and turbine 20 are coupled together by a first rotor shaft 21, and compressor 14 and turbine 18 are coupled together by a second rotor shaft 22.

In operation, air flows through fan assembly 12 and a first portion 50 of the airflow is channeled through booster 32. The compressed air that is discharged from booster 32 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 32 by way of shaft 21. Gas turbine engine assembly 10 is operable at a range of operating conditions between design operating conditions and off-design operating conditions.

A second portion 52 of the airflow discharged from fan assembly 12 is channeled through a bypass duct 40 to bypass a portion of the airflow from fan assembly 12 around core gas turbine engine 13. More specifically, bypass duct 40 extends between a fan casing or shroud 36 and splitter 34. Accordingly, a first portion 50 of the airflow from fan assembly 12 is channeled through booster 32 and then into compressor 14 as described above, and a second portion 52 of the airflow from fan assembly 12 is channeled through bypass duct 40 to provide thrust for an aircraft, for example. Splitter 34 divides the incoming airflow into first and second portions 50 and 52, respectively. Gas turbine engine assembly 10 also includes a fan frame assembly 60 to provide structural support for fan assembly 12 and is also utilized to couple fan assembly 12 to core gas turbine engine 13.

Fan frame assembly 60 includes a plurality of outlet guide vanes 70 that extend substantially radially between a radially outer mounting flange and a radially inner mounting flange and are circumferentially-spaced within bypass duct 40. Fan frame assembly 60 may also include a plurality of struts that are coupled between a radially outer mounting flange and a radially inner mounting flange. In one embodiment, fan frame assembly 60 is fabricated in arcuate segments in which flanges are coupled to outlet guide vanes 70 and struts. In one embodiment, outlet guide vanes and struts are coupled coaxially within bypass duct 40. Optionally, outlet guide vanes 70 may be coupled downstream from struts within bypass duct 40.

Fan frame assembly 60 is one of various frame and support assemblies of gas turbine engine assembly 10 that are used to facilitate maintaining an orientation of various components within gas turbine engine assembly 10. More specifically, such frame and support assemblies interconnect stationary components and provide rotor bearing supports. Fan frame assembly 60 is coupled downstream from fan assembly 12 within bypass duct 40 such that outlet guide vanes 70 and struts are circumferentially-spaced around the outlet of fan assembly 12 and extend across the airflow path discharged from fan assembly 12.

FIG. 2 is an enlarged partial elevational illustration of an exemplary sump pressurization system 80. This design eliminates the rotating duct 90 which is illustrated in the exemplary prior art system shown in FIG. 3. Instead, it channels the pressurized compressor air 83 from the compressor 14 (for example, inwardly through a plurality of source apertures 82 in the HP shaft 22 between adjacent compressor blade rows 87 in the case of an axial compressor as in the embodiment shown) thru a plurality of rotating high pressure compressor (HPC) radial vortex tubes 81 and through the plurality of low pressure turbine (LP) shaft apertures 84 in shaft 21 and forces the air aft as shown by arrow 89 through the LP shaft bore to pressurize the aft sump and forward as shown by arrow 88 to pressurize the mid sump. Vortex tubes 81 may be located, for example, between adjacent compressor disks 86. The vortex tubes 81 are oriented perpendicular to the axis of rotation 11 and are connected to and rotatable with the first hollow shaft 22. A plurality of apertures 84 in the second hollow shaft 21 are in fluid communication with the tubes 81, such that pressurized air flowing through the tubes passes through the apertures into the interior of the second hollow shaft. As shown in FIG. 2, the apertures 84 are axially aligned with the tubes 81, i.e., positioned at the same axial distance along the centerline 11. The LP shaft 21 may be co- or counter-rotating with the high pressure turbine (HP) shaft 22, and in the embodiment shown shafts 21 and 22 share a common axis of rotation. It also isolates the air from the hot HPC and high pressure turbine (HPT) cavities. Also shown in FIGS. 2 and 3 is center vent duct 91, which traverses the length of the shaft 21.

The elimination of the double walled rotating duct 90 shown in FIG. 3 reduces weight and cost per engine and provides additional design engineering savings. It also improves field reliability by eliminating duct failures or replacement due to cracks.

FIG. 3 is an enlarged partial elevational sectional illustration similar to FIG. 2 of a representative prior art sump pressurization system 80. Comparing FIGS. 2 and 3 side by side highlights the differences between the prior art sump pressurization system 80 of FIG. 3 and the exemplary system of FIG. 2.

In the current designs, as shown in FIG. 3, gas turbine aft sump pressurization is usually accomplished by extracting pressurized air 83 from compressor front stages radially inward thru rotating radial vortex tubes 81 and transporting it aft as shown with arrow 89 to the aft sump thru a double walled duct 90 that rotates with the HP shaft 22 about the engine centerline 11. In the new exemplary design, as shown in FIG. 2, the same is accomplished by a new method, by forcing the air radially inward thru rotating HP radial vortex tubes 81 and then thru co/counter rotating LP shaft apertures 84, without the help of the double walled axial flow duct 90. The air that passes thru the LP shaft apertures 22 flows aft thru the center of the hollow LP shaft 21 and into the aft sump pressurization cavity.

The compressor air is brought radially inwards thru radial tubes, rotating at HP speeds and connected to the HP shaft 22 via mechanical connection 85, and exits the tubes at the entrance to the rotating LP shaft holes 84. The air is allowed to free vortex from the HP tube exit to the LP shaft aperture inlet. The apertures 84 in the LP shaft may be co-rotating or counter-rotating with respect to the radial HP tubes. By sizing the LP apertures 84 and the inlet corner radius, the losses are minimized. Once the air enters the LP shaft apertures 84, it flows inward and then axially aft along the engine centerline towards the aft sump as shown by arrow 89.

The pressurization air to the aft sump is supplied without the use of a double walled rotating duct. This simplifies the design by delivering the air to the aft sump thru the center of the LP shaft instead and by eliminating the double walled duct.

The sizes and shapes, as well as the quantity, of vortex tubes and apertures may be selected as desired to deliver the pressurized air at the appropriate pressure and in the appropriate volume required. They may be distributed radially about the central axis of rotation.

While the invention has been described in terms of various specific embodiments, those skilled in the art will recognize that the invention can be practiced with modification within the spirit and scope of the claims.

What is claimed is:

1. A sump pressurization system for a gas turbine engine comprising:
    a first hollow shaft;
    a second hollow shaft disposed within said first hollow shaft and defining a cavity therebetween, each of said first and second hollow shafts having a common axis of rotation;
    a source of pressurized air to pressurize said cavity;
    a plurality of hollow tubes disposed in said cavity, said tubes being oriented perpendicular to said axis of rotation and being connected to and rotatable with said first hollow shaft; and
    a plurality of apertures in said second hollow shaft in fluid communication with said tubes, such that pressurized air flowing through said tubes passes through said apertures into the interior of said second hollow shaft.

2. A sump pressurization system according to claim 1, wherein said pressurized air is delivered to a sump cavity via said second hollow shaft.

3. A sump pressurization system according to claim 2, wherein said sump cavity is an aft sump cavity.

4. A sump pressurization system according to claim 1, wherein said first hollow shaft is a high pressure shaft.

5. A sump pressurization system according to claim 1, wherein said second hollow shaft is a low pressure shaft.

6. A sump pressurization system according to claim 1, wherein said plurality of tubes are distributed radially about said common axis of rotation.

7. A sump pressurization system according to claim 1, wherein said tubes and said apertures are axially aligned.

8. A sump pressurization system according to claim 1, wherein said source of pressurized air is a compressor.

9. A sump pressurization system according to claim 8, wherein said compressor is an axial compressor.

10. A sump pressurization system according to claim 1, wherein said pressurized air enters said cavity via a plurality of source apertures in said first hollow shaft.

11. A sump pressurization system according to claim 10, wherein said plurality of source apertures are located between compressor blade rows.

12. A sump pressurization system according to claim 11, wherein said plurality of source apertures are located between adjacent compressor blade rows.

13. A sump pressurization system according to claim 1, wherein said plurality of tubes are located between adjacent compressor disks.

14. A sump pressurization system according to claim 1, wherein said plurality of tubes are radially oriented.

15. A sump pressurization system for a gas turbine engine comprising:
- a first high pressure hollow shaft;
- a second low pressure hollow shaft disposed within said first hollow shaft and defining a cavity therebetween, each of said first and second hollow shafts having a common axis of rotation;
- a source of pressurized air to pressurize said cavity;
- a plurality of hollow tubes disposed in said cavity, said tubes being oriented perpendicular to and distributed radially about said axis of rotation and being connected to and rotatable with said first hollow shaft; and
- a plurality of apertures in said second hollow shaft in fluid communication with and axially aligned with said tubes, such that pressurized air flowing through said tubes passes through said apertures into the interior of said second hollow shaft and is delivered to an aft sump cavity via said second hollow shaft.

\* \* \* \* \*

UNITED STATES PATENT AND TRADEMARK OFFICE
CERTIFICATE OF CORRECTION

| | |
|---|---|
| PATENT NO. | : 8,915,057 B2 |
| APPLICATION NO. | : 14/237384 |
| DATED | : December 23, 2014 |
| INVENTOR(S) | : Corattiyil et al. |

It is certified that error appears in the above-identified patent and that said Letters Patent is hereby corrected as shown below:

On the Title Page, Item (72), under "Inventors", in Column 1, Line 3,
delete "W Fintel," and insert -- W. Fintel, --, therefor.

Signed and Sealed this
Fifth Day of May, 2015

Michelle K. Lee
*Director of the United States Patent and Trademark Office*